(12) United States Patent
Scoda

(10) Patent No.: US 11,507,639 B1
(45) Date of Patent: Nov. 22, 2022

(54) METHODS FOR IDENTIFYING RECURRING WEB SITE ACCESSIBILITY ISSUES AND DEVICES THEREOF

(71) Applicant: UsableNet Inc., New York, NY (US)

(72) Inventor: Enrico Scoda, Martignacco (IT)

(73) Assignee: USABLENET INC., New York, NY (US)

( * ) Notice: Subject to any disclaimer, the term of this patent is extended or adjusted under 35 U.S.C. 154(b) by 0 days.

(21) Appl. No.: 17/589,351

(22) Filed: Jan. 31, 2022

(51) Int. Cl.
*G06F 16/958* (2019.01)
*G06F 40/117* (2020.01)
*G06F 16/955* (2019.01)
*G06F 16/957* (2019.01)

(52) U.S. Cl.
CPC ........ *G06F 16/986* (2019.01); *G06F 16/9566* (2019.01); *G06F 16/9577* (2019.01); *G06F 40/117* (2020.01)

(58) Field of Classification Search
CPC .............. G06F 16/986; G06F 16/9566; G06F 16/9577; G06F 40/117
See application file for complete search history.

(56) References Cited

U.S. PATENT DOCUMENTS

| | | | |
|---|---|---|---|
| 11,055,208 B1* | 7/2021 | Pandurangarao | G06F 16/958 |
| 2018/0018254 A1* | 1/2018 | Bansal | G06F 11/3604 |
| 2020/0081927 A1* | 3/2020 | Sabbavarpu | G06F 11/3086 |
| 2021/0049234 A1* | 2/2021 | Kumar | G06F 40/194 |
| 2022/0027340 A1* | 1/2022 | Abdoun | G06F 16/958 |
| 2022/0121723 A1* | 4/2022 | Page | G06F 11/3688 |

\* cited by examiner

*Primary Examiner* — Asher D Kells
(74) *Attorney, Agent, or Firm* — Troutman Penner Hamilton Sanders LLP (Rochester)

(57) ABSTRACT

Methods, non-transitory computer readable media, and accessibility analysis devices are disclosed that identify a web page context box. A hash function is applied to properties of elements to generate a semantic layer hash value for a semantic layer for the context box. The properties or elements are identified based on a semantic layer type. A determination is made that the context box is equivalent to another context box of another web page with respect to the semantic layer based on a match of the semantic layer hash value to another semantic layer hash value generated during a prior accessibility evaluation of the other web page. A review of an accessibility issue associated with one of the elements is retrieved based on the other semantic layer hash value. An issue report comprising the accessibility issue, the review, and the one of the elements is then generated and output.

20 Claims, 12 Drawing Sheets

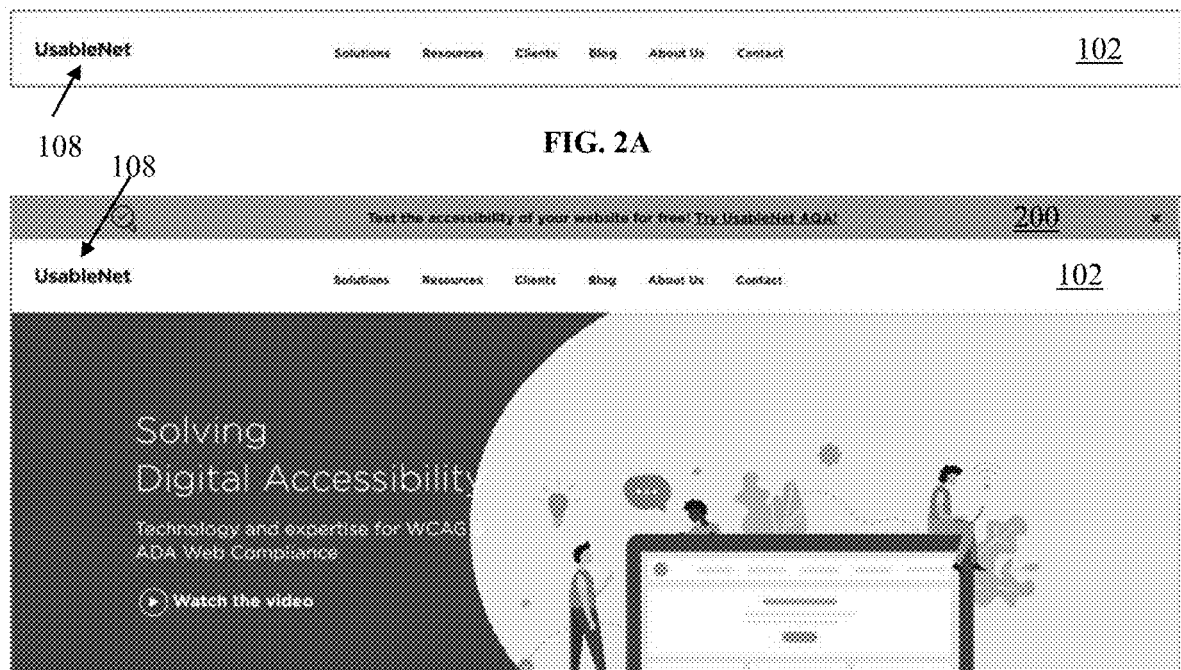
FIG. 2A
FIG. 2B
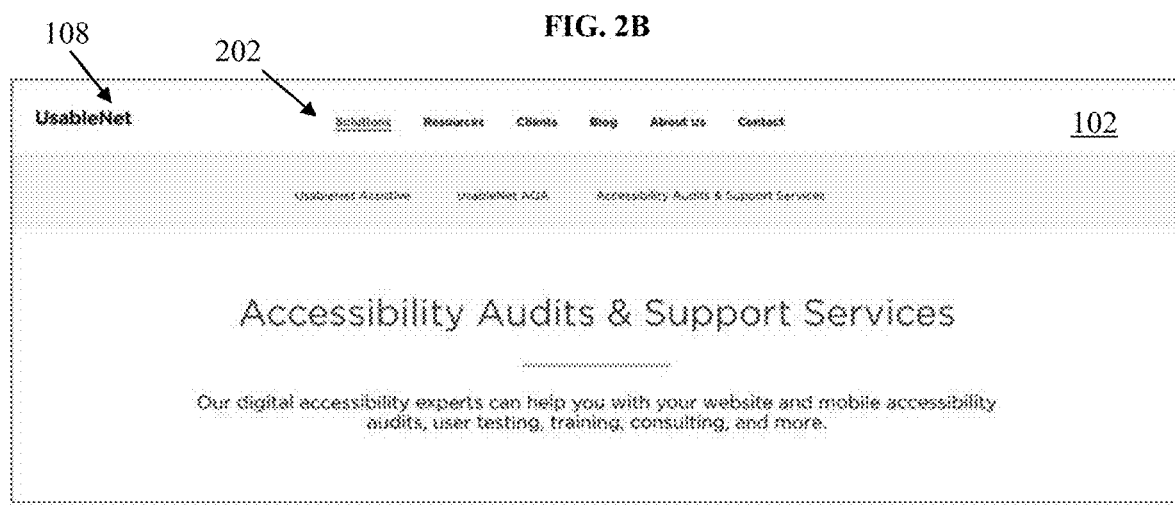
FIG. 2C

```
<div class="product" style="padding:10px; background:#eee; color: #333;">
    <div class="product_image" style="margin:5px">
        <img src="images/red_socks.jpg" alt="Red Socks" width="200px">
    </div>
    <h3>Quality red socks</h3>
    <p>
        The <b>socks</b> for the cosmopolitan woman passionate
        about quality, innovation and elegance.
    </p>
    <a href="buy.php" title="free delivery">Buy</a>
</div>
```

```
<img allyRole="img" allyName="Red Socks"
src="https://acme.com/images/red_socks.jpg"></img><h3 allyRole="heading"
allyName="Quality red socks">Quality red socks</h3>The socks for the
cosmopolitan woman passionate about quality, innovation and elegance.<a
allyRole="link" allyName="Buy" allyDescription="free delivery"
href="https://acme.com/buy.php">Buy</a>
```

```
<div
[606cdb188fa2701ab46288aafd9bd860ce5662c2957afe475ecad5d6c41cc1cc7ee69cc15d4e
cd4d0a95b131961460cc0d7ad3b06288e82a279e66ecba8fba3f
]><div
[8e6f7ae36e10578c7819bc63f18379605d8bf150995ca85014da182f07d45a79f203990ca932
61d528a0cb3fc2efac6c92151a88b6b2a2f92b62f8924806f8f1
]><img allyRole="img" allyName="Red Socks"
[c085ef9c0c2adba04fadfb1747002731f5bde81ba82e295c8d7b6e52d54d029a89949ea75722
ea009620ffe0e145b77d285ea1dcf24f504212bcc4d7373cc52f]
src="https://acme.com/images/red_socks.jpg"
src="images/red_socks.jpg"></img></div><h3 allyRole="heading"
allyName="Quality red socks"
[c085ef9c0c2adba04fadfb1747002731f5bde81ba82e295c8d7b6e52d54d029a89949ea75722
ea009620ffe0e145b77d285ea1dcf24f504212bcc4d7373cc52f]>Quality red
socks</h3><p
[c085ef9c0c2adba04fadfb1747002731f5bde81ba82e295c8d7b6e52d54d029a89949ea75722
ea009620ffe0e145b77d285ea1dcf24f504212bcc4d7373cc52f]>The <b
[c085ef9c0c2adba04fadfb1747002731f5bde81ba82e295c8d7b6e52d54d029a89949ea75722
ea009620ffe0e145b77d285ea1dcf24f504212bcc4d7373cc52f]>socks</b> for the
cosmopolitan woman passionate about quality, innovation and elegance.</p><a
allyRole="link" allyName="Buy" allyDescription="free delivery"
[c085ef9c0c2adba04fadfb1747002731f5bde81ba82e295c8d7b6e52d54d029a89949ea75722
ea009620ffe0e145b77d285ea1dcf24f504212bcc4d7373cc52f]
href="https://acme.com/buy.php">Buy</a></div>
```

METHODS FOR IDENTIFYING RECURRING WEB SITE ACCESSIBILITY ISSUES AND DEVICES THEREOF

FIELD

This technology generally relates to web site accessibility evaluation and, more particularly, to methods and devices for accurate and efficient identification of recurring usability and accessibility issues across a web site.

BACKGROUND

Web site accessibility issues can be identified based on a failure to comply with one or more published guidelines relating to usability and accessibility of web pages (e.g., the Web Content Accessibility Guidelines 2.0, W3C World Wide Web Consortium Recommendation, Dec. 11, 2008, which is incorporated herein by reference and referred to herein as "WCAG 2.0"). Rule sets have been developed to evaluate web pages according to such guidelines that can be applied to web pages and associated source code to identify potential accessibility issues. However, the process of evaluating web site accessibility is currently an inefficient task with the rule sets applied to equivalent and recurring aspects of different web pages of a web site, and duplicative manual review of the identified accessibility issues.

In a web site, parts of the information, and the user interface organizing the information flow, are frequently repeated across the associated web pages. In fact, maintaining a coherent interface across a web site is a key accessibility goal. Web sites are not static collections of web pages, but are rather dynamic sets of information that change for any number of reasons (e.g., a breaking news web site changes continuously and a commerce web site may periodically change its catalog, offers, and/or inventory). Even user interfaces may change as a result of updating branding policies, flow optimizations based on usability studies, and/or changes in customer behavior, for example.

Thus, web site accessibility evaluation results are particularly valuable when compared with previous web site versions, where changes involve only a part of the web site and accessibility issues occurring in unchanged parts are flagged as duplicative (or already identified) as a result of a previous evaluation. Identifying accessibility issues of repeated web page fragments across a web site, and marking them as duplicates, would improve the evaluation workflow for both evaluators of a web site and consumers of evaluation results.

However, identifying recurring issues is complex because web page fragments that look equivalent might be very different in terms of their source code (e.g., with respect to auto-generated HTML attributes, tracking parameters, and/or duplicated but equivalent source code). Additionally, many accessibility issues are not related to a single piece of source code or rendered information, but are instead related to the associated context (e.g., the quality of a paragraph title is measured based on the way it describes the content of the associated paragraph and whether a link label is meaningful can only be based on the labels of surrounding links).

FIGS. 1A-B are screenshots of an exemplary web page 100 with a navigation bar 102, a title section 104, and a description section 106. To determine that "Our Story" is a meaningful or valid title, an evaluator would need to compare it with the text in the associated description section 106. FIGS. 2A-C are screenshots of exemplary web page navigation bars, which are typical shared components that can be found in a web site in different positions (e.g., as illustrated in FIG. 2B below banner 200) or with different style (e.g., as illustrated by the highlighted link 202 in FIG. 2C). In this example, the links are considered good (i.e., not accessibility issues) in the context of the whole navigation bar 102.

In another example, FIGS. 3A-D are screenshots of an exemplary web page 300 with various content sections 302, 304, and 306. The content sections 302 and 304 include titles that can only be evaluated based on the associated text. Additionally, the content section 306 includes a "More Resources" link 308 that is only meaningful in the context of the whole content section 306. Accessibility considerations are not restricted to a relationship between text labels and content. For example, the "More Resources" link 308 should use background and foreground colors with appropriate contrast, and the link 308 should be separated from other graphical elements in its context with appropriate space and contrast. Many other accessibility guidelines with associated rules can be followed in order to improve usability and accessibility of web sites for an increased number of users.

Identifying context fragments, which are referred to herein as context boxes, can be based on heuristics related to graphical layout or HTML grammar, for example, but determining that two context boxes are equivalent is a challenge. Current attempts at determining context box equivalency are too lazy, and therefore produce false positives, and too selective for many accessibility issues (i.e., a pixel-by-pixel comparison). Absent accurate identification of equivalent context boxes and associated issues, current evaluation systems are inefficient, requiring duplicative evaluation of equivalent web site fragments and manual review of accessibility issues across sequential evaluations of web pages in the same web site.

SUMMARY

A method for evaluating web site accessibility is disclosed that is implemented by one or more accessibility analysis devices and includes identifying a first context box of a first web page based on disposition, geometry, or role of one or more elements within the first context box in response to a received request to evaluate accessibility of the first web page. A hash function is applied to one or more properties of one or more of the elements to generate a first semantic layer hash value for a first semantic layer for the first context box. The properties or the one or more of the elements are identified based on a type of the first semantic layer. A determination is made that the first context box is equivalent to a second context box of a second web page with respect to the first semantic layer based on a match of the first semantic layer hash value to a stored second semantic layer hash value generated during a prior accessibility evaluation of the second web page. A review of an accessibility issue associated with one of the one or more of the elements is then retrieved from an issue database based on the second semantic layer hash value. An issue report comprising the accessibility issue, the review, and the one of the one or more of the elements is generated and output in response to the received request.

An accessibility analysis device is disclosed that includes memory including programmed instructions stored thereon and one or more processors configured to execute the stored programmed instructions to identify a first context box of a first web page based on disposition, geometry, or role of one or more elements within the first context box in response to a received request to evaluate accessibility of the first web page. A hash function is applied to one or more properties of one or more of the elements to generate a first semantic layer hash value for a first semantic layer for the first context box. The properties or the one or more of the elements are identified based on a type of the first semantic layer. A determination is made that the first context box is equivalent to a second context box of a second web page with respect to the first semantic layer based on a match of the first semantic layer hash value to a stored second semantic layer hash value generated during a prior accessibility evaluation of the second web page. A review of an accessibility issue associated with one of the one or more of the elements is then retrieved from an issue database based on the second semantic layer hash value. An issue report comprising the accessibility issue, the review, and the one of the one or more of the elements is generated and output in response to the received request.

A non-transitory computer readable medium having stored thereon instructions for evaluating web site accessibility is disclosed that includes executable code that, when executed by one or more processors, causes the one or more processors to identify a first context box of a first web page based on disposition, geometry, or role of one or more elements within the first context box in response to a received request to evaluate accessibility of the first web page. A hash function is applied to one or more properties of one or more of the elements to generate a first semantic layer hash value for a first semantic layer for the first context box. The properties or the one or more of the elements are identified based on a type of the first semantic layer. A determination is made that the first context box is equivalent to a second context box of a second web page with respect to the first semantic layer based on a match of the first semantic layer hash value to a stored second semantic layer hash value generated during a prior accessibility evaluation of the second web page. A review of an accessibility issue associated with one of the one or more of the elements is then retrieved from an issue database based on the second semantic layer hash value. An issue report comprising the accessibility issue, the review, and the one of the one or more of the elements is generated and output in response to the received request.

This technology provides a number of advantages including methods, non-transitory computer readable media, and accessibility analysis devices that advantageously evaluate and store web page accessibility issues, and store the issues along with associated reviews, to facilitate effective and efficient identification of equivalent accessibility issues in different web page fragments on different web pages, or web page versions, of a same web site. This technology divides accessibility issues based on semantic layers (e.g., text, cascading style sheet (CSS), and layout layers) that include only the information required to identify a particular issue within a particular semantic layer and context box.

For example, to evaluate the quality of the links in the navigation bar 102 according to exemplary accessibility guidelines and applicable rule(s), only the alternative text of the logo image 108 associated to the image URL and the labels of all the links of the navigation bar 102 associated to their respective URLs may be required. This representation is the same for the web pages illustrated in FIGS. 2B-C even though the position and style, respectively, of the navigation bar 102 is different in those web pages. Accordingly, the representation will allow a determination of equivalency for the quality of the links of the navigation bar 102 across a particular semantic layer despite the differences between web page versions across other semantic layers (e.g., a CSS semantic layer, which would require a different representation as a result of the highlighted link 202, and a layout semantic layer, which would require a different representation as a result of the position of the navigation bar 102 in the web page of FIG. 2B).

After dividing accessibility issues according to semantic layers, this technology generates a representation of each context box identified for a web page based on a representation of a particular semantic layer, and signs the representation (e.g., with a hash value). The position of element(s) in the context box that have an accessibility issue is also stored correlated with the signed representation.

With the stored information, a context box can be considered equivalent within a particular semantic layer based on a hash value match, and a previously-stored and associated accessibility issue and associated review for any number of elements can be identified, and applied without additional analysis, based on the position of an element within a context box. Accordingly, this technology more accurately and efficiently evaluates web page accessibility issues across a web site by reducing or eliminating duplicative accessibility evaluations of web page fragments that are equivalent across semantic layer(s) associated with particular accessibility issues.

BRIEF DESCRIPTION OF THE DRAWINGS

FIGS. 2A-C are screenshots of exemplary web page navigation bars;

FIG. 11 is source code for a web page fragment;

FIG. 12 is text representation of a text semantic layer for the web page fragment of FIG. 11;

FIG. 13 is a text representation of a cascading style sheet (CSS) semantic layer for the web page fragment of FIG. 11.

DETAILED DESCRIPTION

Figure 1A:
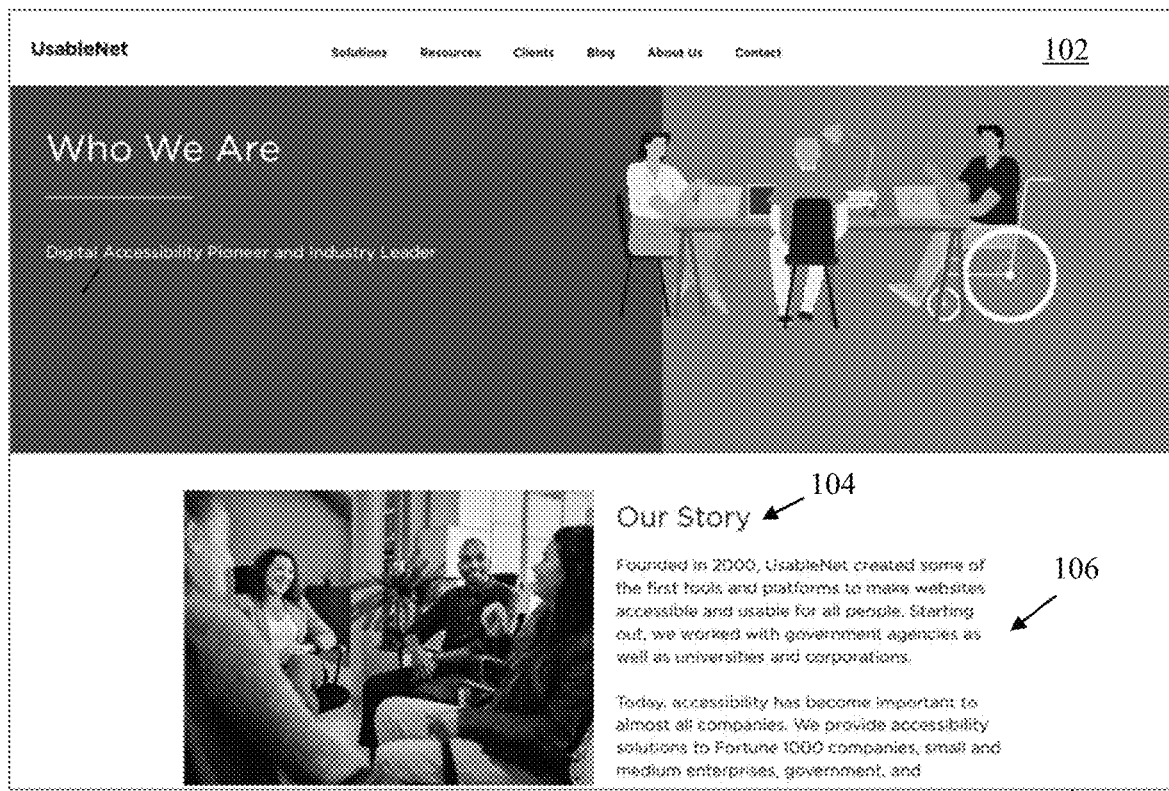
FIGS. 1A-B are screenshots of an exemplary web page with a navigation bar, a title section, and a description section.
Figure 1B:
Figure 3A:
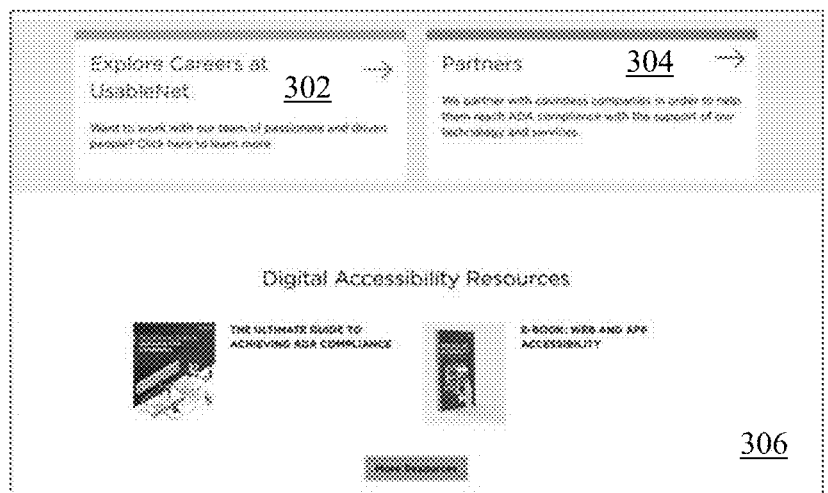
FIGS. 3A-D are screenshots of another exemplary web page with various content sections.
Figure 3B:
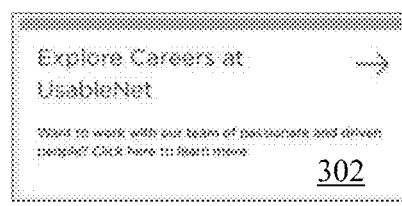
Figure 3C:
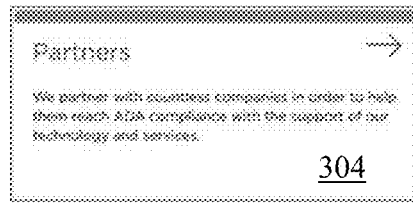
Figure 3D:
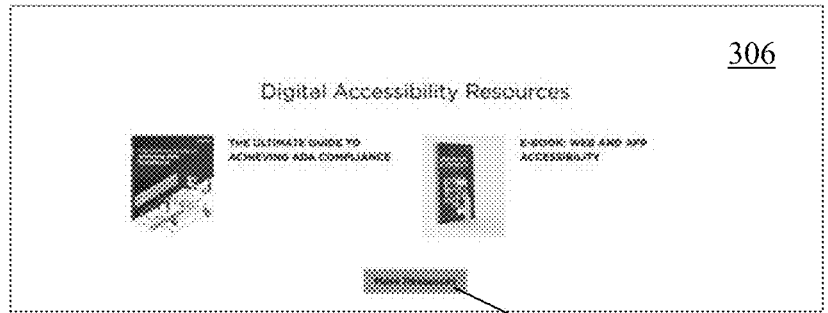
Figure 4:
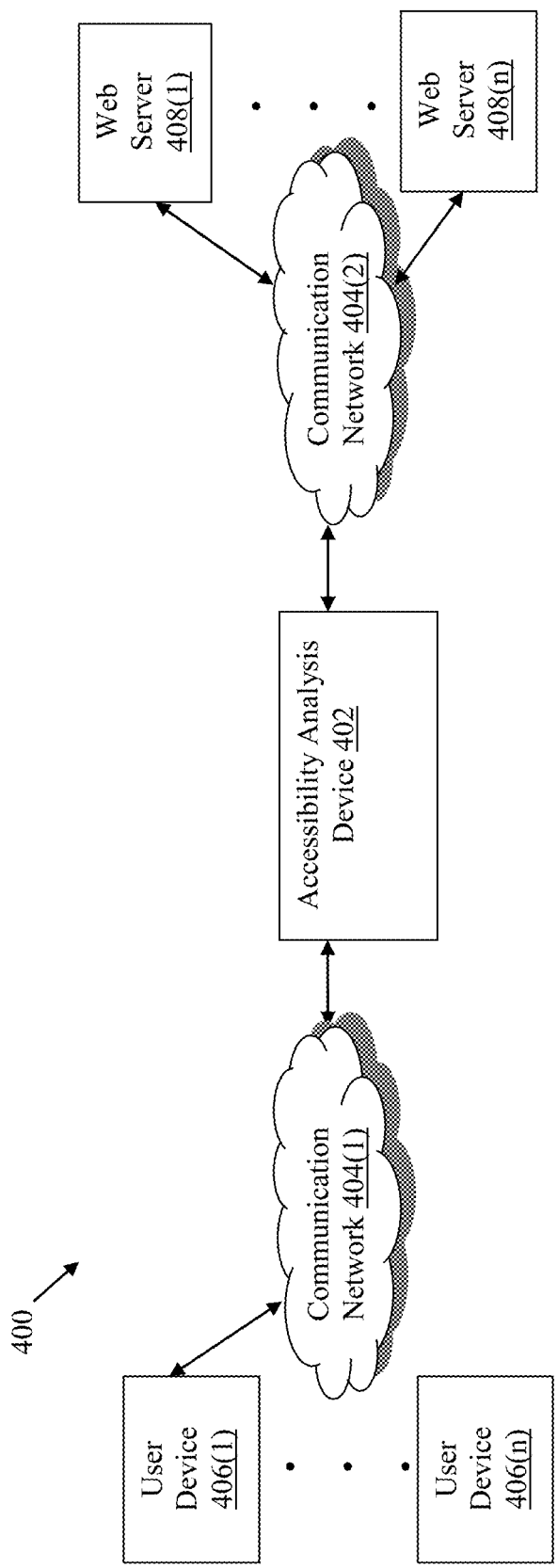
FIG. 4 is a block diagram of an exemplary network environment with an accessibility analysis device.

Referring to FIG. 4, an exemplary network environment 400 is illustrated that includes an accessibility analysis device 402 coupled, via communication network 404(1), to user devices 406(1)-406(n) and, via communication networks 404(2), web servers 408(1)-408(n). The network environment 400 may include other network devices such as one or more routers or switches, for example, which are known in the art and thus will not be described herein. This technology provides a number of advantages including methods, non-transitory computer readable media, and accessibility analysis devices that facilitate accurate identification of recurring accessibility issues across a web site to more efficient facilitate web site accessibility evaluations.

In this particular example, the user devices 406(1)-406(n), accessibility analysis device 402, and web servers 408(1)-408(n) are disclosed in FIG. 4 as dedicated hardware devices. However, one or more of the user devices 406(1)-406(n), accessibility analysis device 402, or web servers 408(1)-408(n) can also be implemented in software within one or more other devices in the network environment 10. As one example, the accessibility analysis device 402, as well as any of its components or applications, can be implemented as software executing on one of the web servers 408(1)-408(n), and many other permutations and types of implementations can also be used in other examples.

Figure 5:
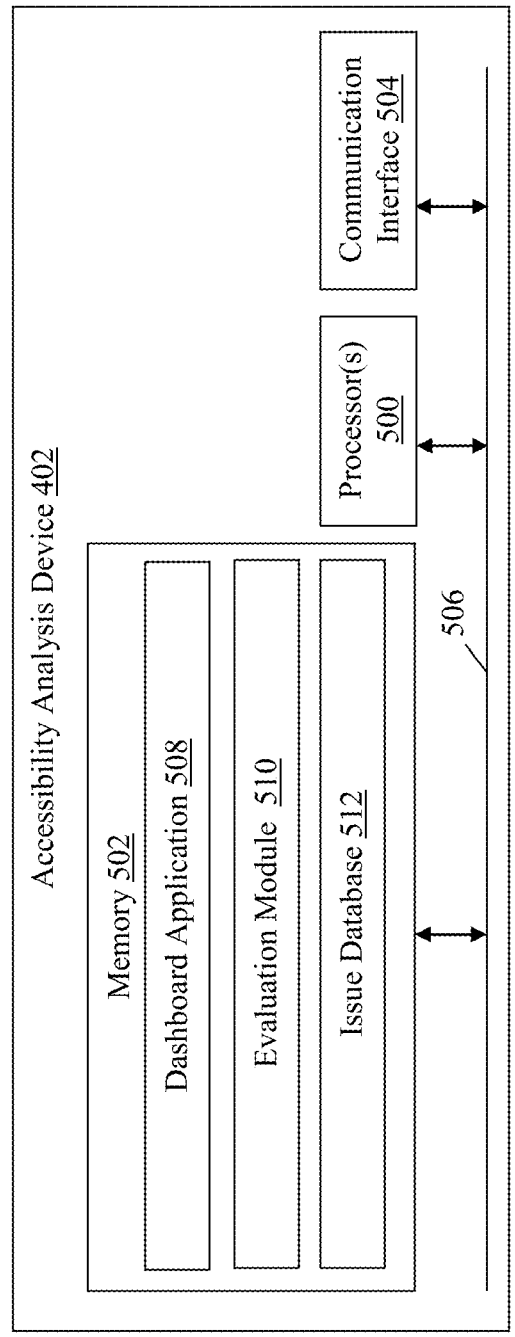
FIG. 5 is a block diagram of an exemplary accessibility analysis device.

Referring to FIGS. 4-5, the accessibility analysis device 402 of the network environment 400 may perform any number of functions, including providing graphical user interfaces (GUIs) to the user devices 14(1)-14(n), and communicating with the web servers 408(1)-408(n) to facilitate web site accessibility evaluations. The accessibility analysis device 402 in this example includes one or more processor(s) 500, a memory 502, and a communication interface 504, which are coupled together by a bus 506, although the accessibility analysis device 402 can include other types or numbers of elements in other configurations.

The processor(s) 500 of the accessibility analysis device 402 may execute programmed instructions stored in the memory 502 of the accessibility analysis device 402 for any number of the functions described and illustrated herein. The processor(s) 500 may include one or more central processing units (CPUs) or general purpose processors with one or more processing cores, for example, although other types of processor(s) can also be used.

The memory 502 of the accessibility analysis device 402 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 500, can be used for the memory 502.

Accordingly, the memory 502 of the accessibility analysis device 402 can store one or more applications that can include computer executable instructions that, when executed by the accessibility analysis device 402, cause the accessibility analysis device 402 to perform actions, such as to transmit, receive, or otherwise process network messages and requests, for example, and to perform other actions described and illustrated below with reference to FIGS. 6-14. The application(s) can be implemented as components of other applications, operating system extensions, and/or plugins, for example.

Further, the application(s) may be operative in a cloud-based computing environment. The application(s) can be executed within or as virtual machine(s) or virtual server(s) that may be managed in a cloud-based computing environment. Also, the application(s), and even the accessibility analysis device 402 itself, may be located in virtual server(s) running in a cloud-based computing environment rather than being tied to one or more specific physical network computing devices. Also, the application(s) may be running in one or more virtual machines (VMs) executing on the accessibility analysis device 402. Additionally, in one or more examples of this technology, virtual machine(s) running on the accessibility analysis device 402 may be managed or supervised by a hypervisor.

In this particular example, the memory 502 of the accessibility analysis device 402 includes a dashboard application 508, an evaluation module 510, and an issue database 512. The dashboard application 508 provides GUI(s) to users of the user devices 14(1)-14(n), which can include web application developers or testers, accessibility issue reviewers, or consumers of accessibility evaluations, for example. The dashboard application 508 in this example receives an indication (e.g., a URL) of a web page or web site and retrieves the associated web page from one of the web servers 408(1)-408(2).

The dashboard application 508 subsequently presents an issue review report via another GUI in response to the request, which includes an indication of accessibility issues identified in the web page and any prior review results that have been retrieved for stored equivalent issues. The dashboard application 508 can also receive via the provided GUI reviews of accessibility issues, which can be stored in the issue database 512 along with additional contextual information related to the reviewed accessibility issues including the signed representation of a semantic layer associated with the issue and the element position within the associated context box for the element associated with the accessibility issue, as described and illustrated in more detail below.

The evaluation module 510 is configured to evaluate the web page retrieved by the dashboard application 508 with respect to accessibility issues. The evaluation module 510 can be apply rule sets to aspects of the web page source code, for example, based on accessibility guidelines in order to identify potential accessibility issues. For example, the evaluation module 510 can be configured to identify potential accessibility issues relating to insufficient contrast, lack of text alternatives for non-text content (e.g., images), or any other issue that may impact the usability or accessibility of the web page.

In this particular example, the evaluation module 510 is further configured to identify context boxes of the web page, generate and sign representations for semantic layers for the identified context boxes, and use the signed representations and contents of the issue database 512 to retrieve stored prior reviews for accessibility issues associated with equivalent semantic layers for corresponding context boxes. The stored prior reviews are provided to the dashboard application 508 to reduce the manual review required for an evaluator of the issue review report output by the dashboard application. Using the signed representations and issue database 512, the equivalency of the prior accessibility issues and associated review are more accurately identified even when the corresponding context boxes differ across other semantic layers. The operation of the evaluation module 510 is described and illustrated in more detail later with reference to FIGS. 6-14.

The issue database 512 stores signed representations of semantic layers for context boxes with elements for which accessibility issues have been identified by the evaluation module 510, along with the position of those elements within the context box and reviews of the accessibility issues as obtained by the dashboard application 508, for example. Accordingly, the issue database 512 advantageously facilitates the identification of equivalent context boxes with respect to particular semantic layers, and the accessibility issues and the associated reviews that are identifiable based on the information for those semantic layers, which is encapsulated by the stored signed representations. With the accurate identification of corresponding accessibility issues across different web pages of a same web site, the issue review report can be populated by the dashboard application 508 with prior reviews to improve the efficiency of the web site accessibility evaluation.

The communication interface 504 of the accessibility analysis device 402 operatively couples and communicates between the accessibility analysis device 402, user devices 406(1)-406(n), and web servers 408(1)-408(n), which are coupled together at least in part by the communication networks 404(1) and 404(2), although other types or numbers of communication networks or systems with other types or numbers of connections or configurations to other devices or elements can also be used.

By way of example only, the communication network 404(1) and 404(2) can include local area network(s) (LAN(s)) or wide area network(s) (WAN(s)), and can use TCP/IP over Ethernet and industry-standard protocols, although other types or numbers of protocols or communication networks can be used. The communication network 404(1) and 404(2) in this example can employ any suitable interface mechanisms and network communication technologies including, for example, Ethernet-based Packet Data Networks (PDNs).

While the accessibility analysis device 402 is illustrated in this example as including a single device, the accessibility analysis device 402 in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the accessibility analysis device 402. Additionally, one or more of the devices that together comprise the accessibility analysis device 402 in other examples can be standalone devices or integrated with one or more other devices or apparatuses.

Each of the user devices 406(1)-406(n) of the network environment 400 in this example includes any type of computing device that can exchange network data, such as mobile, desktop, laptop, or tablet computing devices, virtual machines (including cloud-based computers), or the like. Each of the user devices 406(1)-406(n) in this example includes a processor, a memory, and a communication interface, which are coupled together by a bus or other communication link (not illustrated), although other numbers or types of components could also be used.

Each of the user devices 406(1)-406(n) may run interface applications, such as standard web browsers or standalone client applications, which may provide an interface to communicate with the accessibility analysis device 402 via the communication network 404(1). Each of the user devices 406(1)-406(n) may further include a display device, such as a display screen or touchscreen, or an input device, such as a keyboard or mouse, for example (not illustrated).

Each of the web servers 408(1)-408(n) in this example includes one or more processors, a memory, and a communication interface, which are coupled together by a bus or other communication link, although other numbers or types of network devices could be used. The web servers 408(1)-408(n) in this example process requests received from the accessibility analysis device 402 related to hosted web pages via the communication network 404(2) according to the HTTP-based application RFC protocol, for example. Various applications may be operating on the web servers 408(1)-408(n) and transmitting data (e.g., files or web pages) to the accessibility analysis device 402. The web servers 408(1)-408(n) may be hardware or software or may represent a system with multiple servers in a pool, which may include internal or external networks.

Although the web servers 408(1)-408(n) are illustrated as single devices, one or more actions of each of the web servers 408(1)-408(n) may be distributed across one or more distinct network computing devices that together comprise one or more of the web servers 408(1)-408(n). Moreover, the web servers 408(1)-408(n) are not limited to a particular configuration. Thus, the web servers 408(1)-408(n) may contain a plurality of network computing devices that operate using a master/slave approach, whereby one of the network computing devices of the web servers 408(1)-408(n) operate to manage and/or otherwise coordinate operations of the other network computing devices. The web servers 408(1)-408(n) may operate as a plurality of network computing devices within a cluster architecture, a peer-to peer architecture, virtual machines, or within a cloud architecture, for example.

Although the exemplary network environment 400 with the user devices 406(1)-406(n), accessibility analysis device 402, web servers 408(1)-408(n), and communication network 404(1) and 404(2) are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 400, such as the user devices 406(1)-406(n), accessibility analysis device 402, or web servers 408(1)-408(n), for example, may be configured to operate as virtual instances on the same physical machine. In other words, one or more of the user devices 406(1)-406(n), accessibility analysis device 402, or web servers 408(1)-408(n) may operate on the same physical device rather than as separate devices communicating through communication network 404(1) or 404(2). Additionally, there may be more or fewer user devices, accessibility analysis devices, or web servers than illustrated in FIG. 4.

The examples of this technology may also be embodied as one or more non-transitory computer readable media having instructions stored thereon, such as in the memory 502, for one or more aspects of the present technology, as described and illustrated by way of the examples herein. The instructions in some examples include executable code that, when executed by one or more processors, such as the processor(s) 500, cause the processors to carry out steps necessary to implement the methods of the examples of this technology that are described and illustrated herein.

Figure 6:
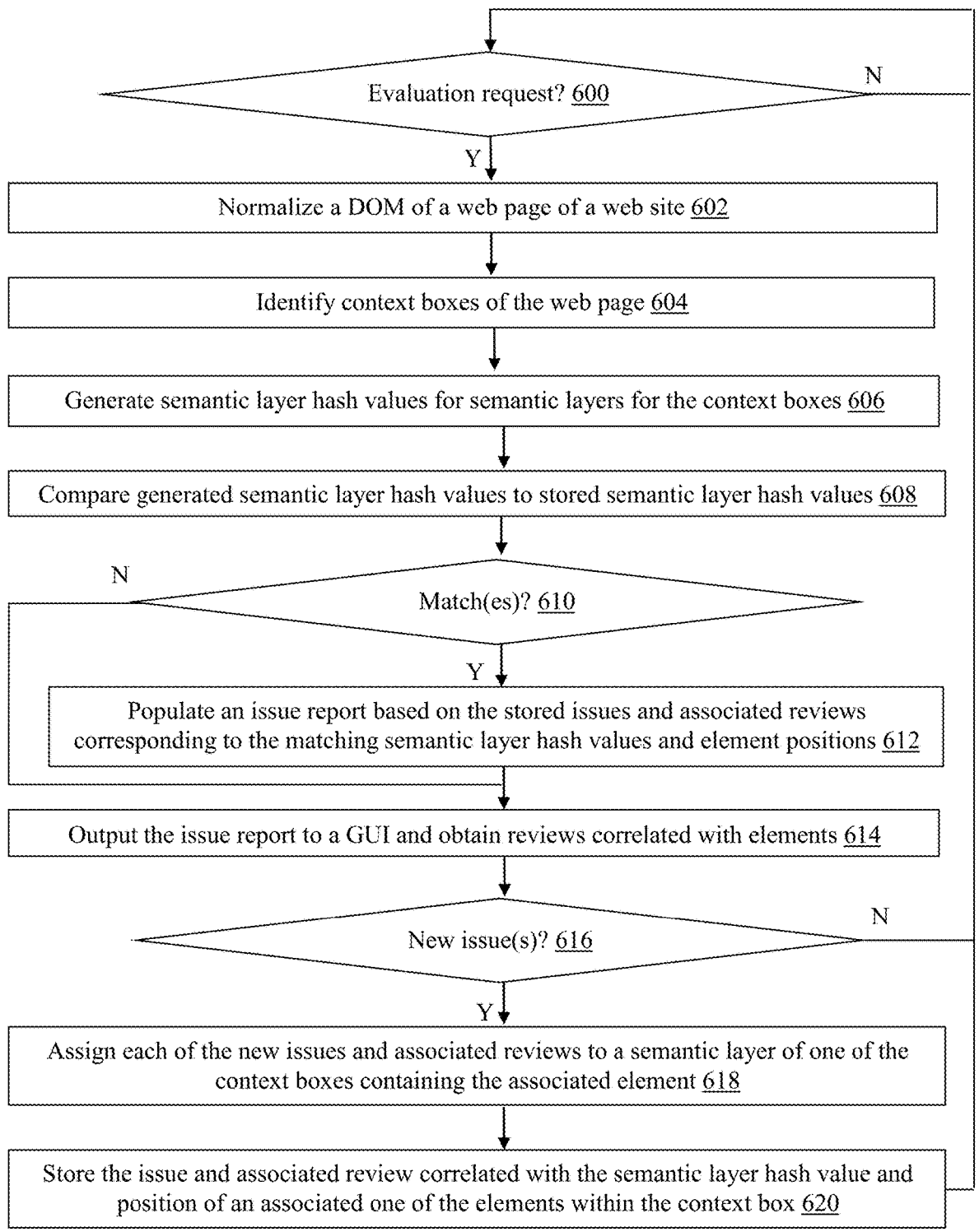
FIG. 6 is a flowchart of an exemplary method for identifying recurring accessibility issues across a web site.

Referring to FIG. 6, a flowchart of an exemplary method for identifying recurring accessibility issues across a web site is illustrated. In step 600 in this example, the accessibility analysis device 402 determines whether an accessibility evaluation request has been received, such as from one of the user devices 406(1)-406(n), for example. The request can be received via a GUI provided to one of the user devices 406(1)-406(n) and can include an indication of a particular web page URL, such as a URL of a home page of a web site including a plurality of web pages to be evaluated for accessibility issues. If the accessibility analysis device 402 determines that an evaluation request has not been received, then the accessibility analysis device 402 returned to step 600 and effectively waits to receive an evaluation request in this example. However, if the accessibility analysis device 402 determines an evaluation request has been received, then the Yes branch is taken to step 602.

In step 602, the accessibility analysis device 402 normalizes a document object model (DOM) of a web page of a web site, such as the home page for the web site associated with the URL received with the evaluation request in step 600, for example. By normalizing the DOM of the web page, the accessibility analysis device 402 removes or standardizes part of the web page that do not influence the layout or accessibility properties or behavior of the web page.

Figure 7:
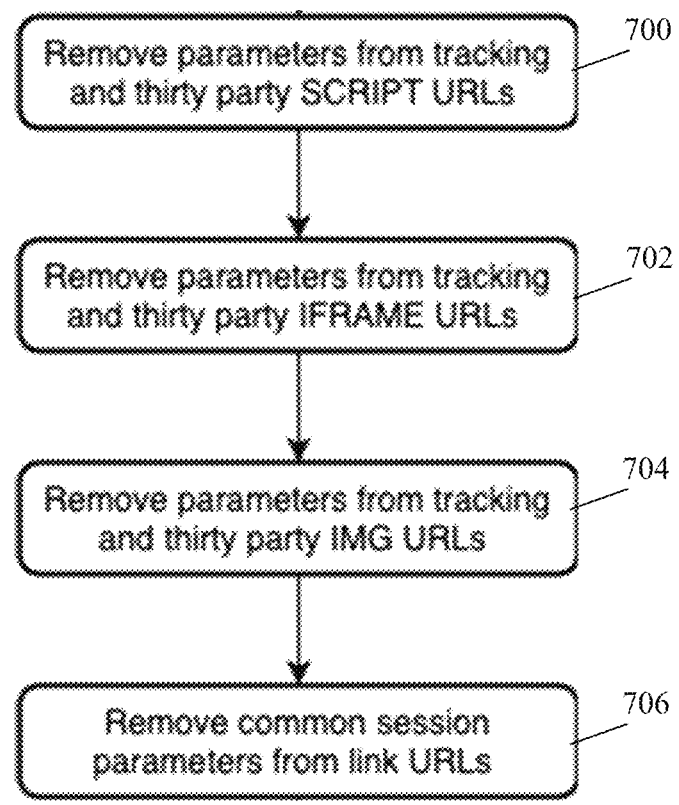
FIG. 7 is a flowchart of an exemplary method for normalizing a document object model (DOM) of a web page.

Referring to FIG. 7, a flowchart of an exemplary method for normalizing the DOM of the web page is illustrated. In step 700, the accessibility analysis device 402 removes parameters from tracking and third party script URLs that are present in the web page since the behavior of the tracking scripts does not depend on those parameters. Removing parameters from tracking script URLs does not remove the scripts from the accessibility evaluation but allows the accessibility analysis device 402 to consider the tracking script URLs to be equivalent.

In steps 702 and 704, the accessibility analysis device 402 removes parameters from tracking and third party inline frame and image URLs, respectively. The inline frame and image HTML elements that include those URLs are often created by the tracking and third party scripts to facilitate tracking or external advertisements, for example, and do not impact the behavior of the scripts or the web page containing those HTML elements.

In step 706, the accessibility analysis device 402 removes common session parameters (e.g., "jsessionid" for J2EE web applications) from URLs of the web page. Optionally, the accessibility analysis device 402 can also remove cross site request forgery (CSFR) tokens and/or campaign parameters (e.g., links pointing to external marketplace web sites), and other web page content can also be removed in order examples to normalize the DOM and facilitate a determination of equivalency across context boxes of different web pages.

Referring back to FIG. 6, in step 604, the accessibility analysis device 402 identifies context boxes of the web page. Context boxes include web page fragments required in order to evaluate accessibility issues with respect to particular elements contained in the fragments. Exemplary context boxes include the description section 106 and the navigation bar 102. In this example, the web page is divided into context boxes, which are further divided based on semantic layers to analyze equivalency of portions of the web page.

Figure 8:
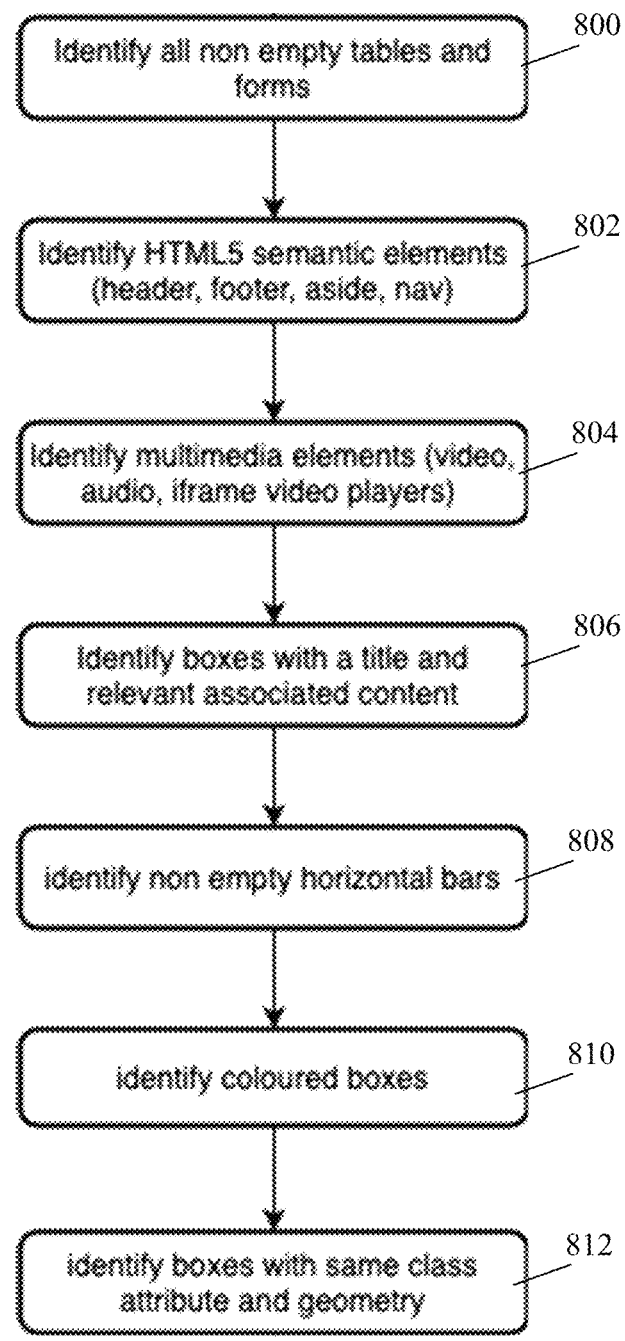
FIG. 8 is a flowchart of an exemplary method for identifying context boxes of a web page.

Referring to FIG. 8, a flowchart of an exemplary method for identifying context boxes of a web page is illustrated. In step 800, the accessibility analysis device 402 identifies all non-empty tables and forms as context boxes. The identified context boxes can optionally be flagged or separately extracted, for example, and any other identification method to mark portions or fragments of the web page as context boxes can also be used.

In step 802, the accessibility analysis device 402 identifies semantic elements (e.g., HTML 5 header, footer, navigation, and aside elements) as context boxes. The identified semantic elements are used to define different parts of a web page as compared to elements such as division and span elements that do not tell the web browser anything about the content of the web page.

In step 804, the accessibility analysis device 402 identifies multimedia elements as context boxes. Multimedia elements can include video, audio, or inline frame elements with video players, for example, although other types of multimedia elements can also be identified as context boxes. Accordingly, steps 800-804 illustrate exemplary methods for identifying context boxes based on a semantic nature or role of web page elements.

In step 806, the accessibility analysis device 402 identifies web page sections that have a title and relevant associated content as context boxes. For example, the accessibility analysis device can, for each header in the web page, select a first ancestor having meaningful content following the header, although other ways of identifying sections with a title and associated content can also be used. Whether the content is meaningful can be determined based on the application of rules that analyze the type, size, number of words, etc. of the content, for example. In one particular example, meaningful content is determined based on sub element(s) having text or alternative text longer than a defined threshold length, or interactive controls or links, for example.

In step 808, the accessibility analysis device 402 identifies non-empty horizontal bars of the web page as context boxes. In one example, the accessibility analysis device 402 can consider all elements consuming the whole width of the page having meaningful content and a minimum height as context boxes. By applying rules to determining whether the content is meaningful and/or the height exceeds a threshold, the accessibility analysis device 402 can avoid consideration of banners and decorative bars, for example, as context boxes.

In step 810, the accessibility analysis device 402 identifies colored sections as context boxes. Colored sections can be identified as elements having meaningful content and a threshold area (e.g., 200×200 pixels) with a background color different from the background of other elements containing the elements, for example. Whether the content is meaningful can be determined as explained above with reference to step 806, for example.

In step 812, the accessibility analysis device 402 identifies sections with the same class attribute and geometry as context boxes. In some examples, the accessibility analysis device 402 considers elements with the same class attribute value and meaningful content with the same width and height and aligned horizontally or vertically as context boxes. Accordingly, steps 806-812 illustrate exemplary methods for identifying context boxes based on web page content disposition and geometry. While seven exemplary methods for identifying context boxes are illustrated in FIG. 8, other identification methods can also be used in other examples.

Referring back to FIG. 6, in step 606, the accessibility analysis device 402 generates semantic layer hash values for semantic layers for the context boxes identified in step 604. In one examples, the semantic layers can include shell, text, cascading style sheet (CSS), layout, table, and media layers. In this example, the shell semantic layer can include all web page elements, without text node or attributes, resulting in representation in which only element position is reflected. The text semantic layer can include web page elements with their relevant attributes and accessibility name, description, and role, for example.

A CSS semantic layer can include all CSS properties, including those not related to position, with their relevant attributes and accessibility name, description, and role, for example. The layout semantic layer can be the same as the CSS semantic layer, but including CSS property position and size. In the table semantic layer, only web page elements defining tables are included along with relevant content elements. The media semantic layer can include media web page elements and their sub elements.

In other examples, other types and/or another number of semantic layers can be defined. In some examples, the accessibility analysis device 402 can be configured to balance the number of semantic layers versus defining each semantic layer to describe only one accessibility issue and its context with the minimum number of web page elements and properties. The configuration can be based on available computation and storage resources for particular implementations, for example.

Figure 9:
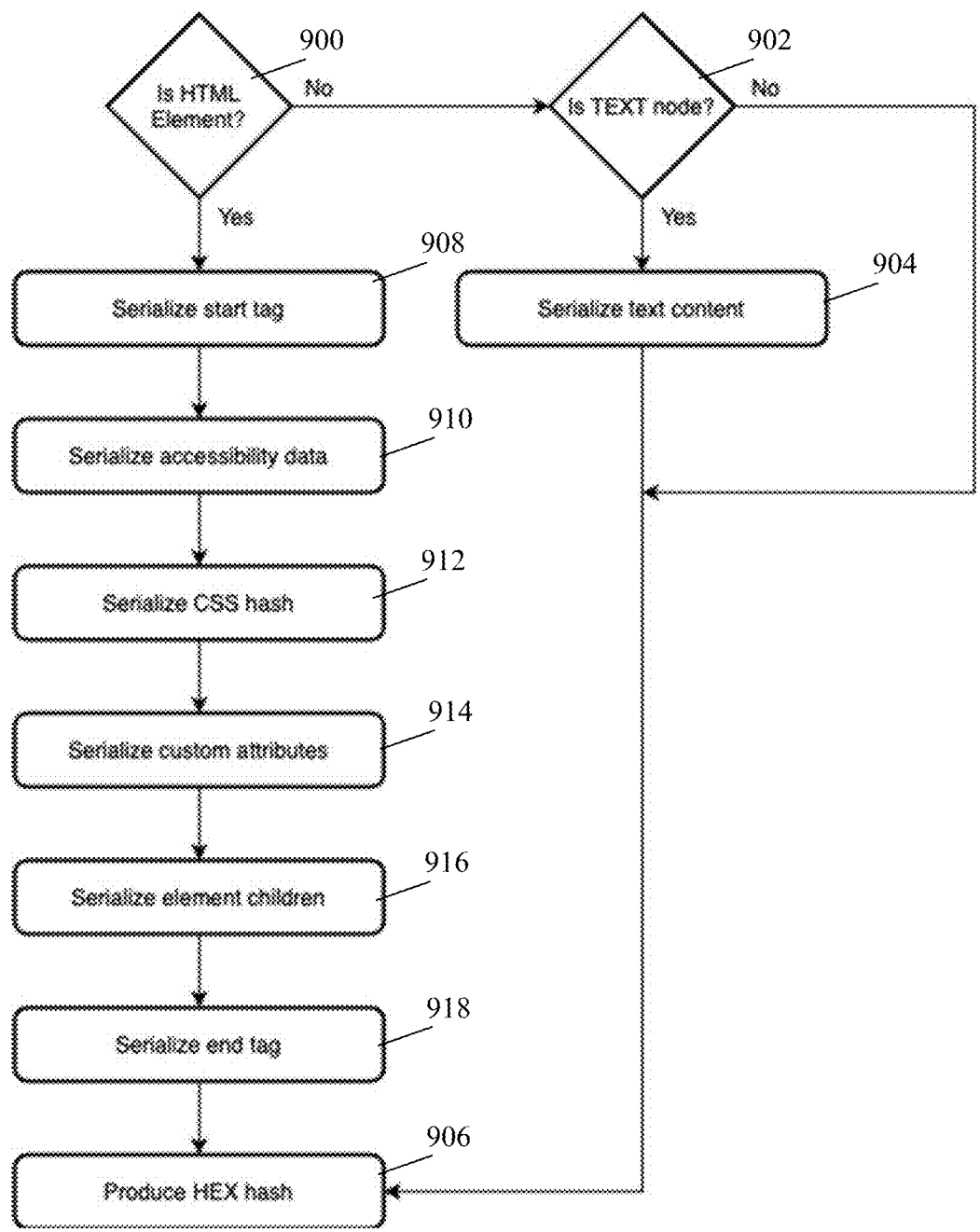
FIG. 9 is a flowchart of an exemplary method for generating a semantic layer hash value for a context box.

Referring to FIG. 9, a flowchart of an exemplary method for generating a semantic layer hash value for a context box is illustrated. In step 900 in this example, the accessibility analysis device 402 determines whether the context box corresponds with an HTML element of the web page, optionally with any number of sub or child elements. The determination in step 900 can be based on the application of a rule set to the web page source code content. For example, if the context box includes CSS properties, the context box will correspond with an HTML element. Optionally, the accessibility analysis device 402 can mark a type (e.g., HTML element or text) of each context box subsequent to identifying the context boxes as described above with reference to FIG. 8. If the accessibility analysis device 402 determines that the context box does not correspond to an HTML element, then the No branch is taken to step 902.

In step 902, the accessibility analysis device 402 determines whether the context box corresponds to a text node, such as may be used in a text semantic layer, for example. If the accessibility analysis device 402 determines that the context box corresponds with a text node, then the Yes branch is taken to step 904.

In step 904, the accessibility analysis device 402 serializes the text content of the context box. Accordingly, the accessibility analysis device 402 essentially converts relevant textual content of the context box into a text string. Subsequent to serializing the text content, or if the accessibility analysis device 402 determines in step 902 that the context box does not correspond to a text node and the No branch is taken, then the accessibility analysis device 402 proceeds to step 906.

In step 906, the accessibility analysis device 402 generates the semantic layer hash value by applying a hash function to the remaining representation of the context box (e.g., subsequent to serialization of the text content in step 904). Any hash function can be used including a SHA512 function, which would result in reduced hash collisions extremely in a relatively limited set of data associated with a web site. Referring back to step 900, if the accessibility analysis device 402 determines that the context box corresponds with an HTML element, then the Yes branch is taken to step 908.

In steps 908, 910, and 912, the accessibility analysis device 402 serializes the start tag of the HTML element, accessibility data for the HTML element (e.g., name, description, and role), and a CSS element hash value for the HTML element, respectively. Accordingly, the accessibility analysis device 402 creates a text string representation of the start tag, accessibility data, and CSS element hash value. In this particular example, steps 900-18 are performed to facilitate generation, in step 906, of a CSS semantic layer hash value, although other hash values for other types of semantic layers can be generated in a similar manner in other examples.

Figure 10:
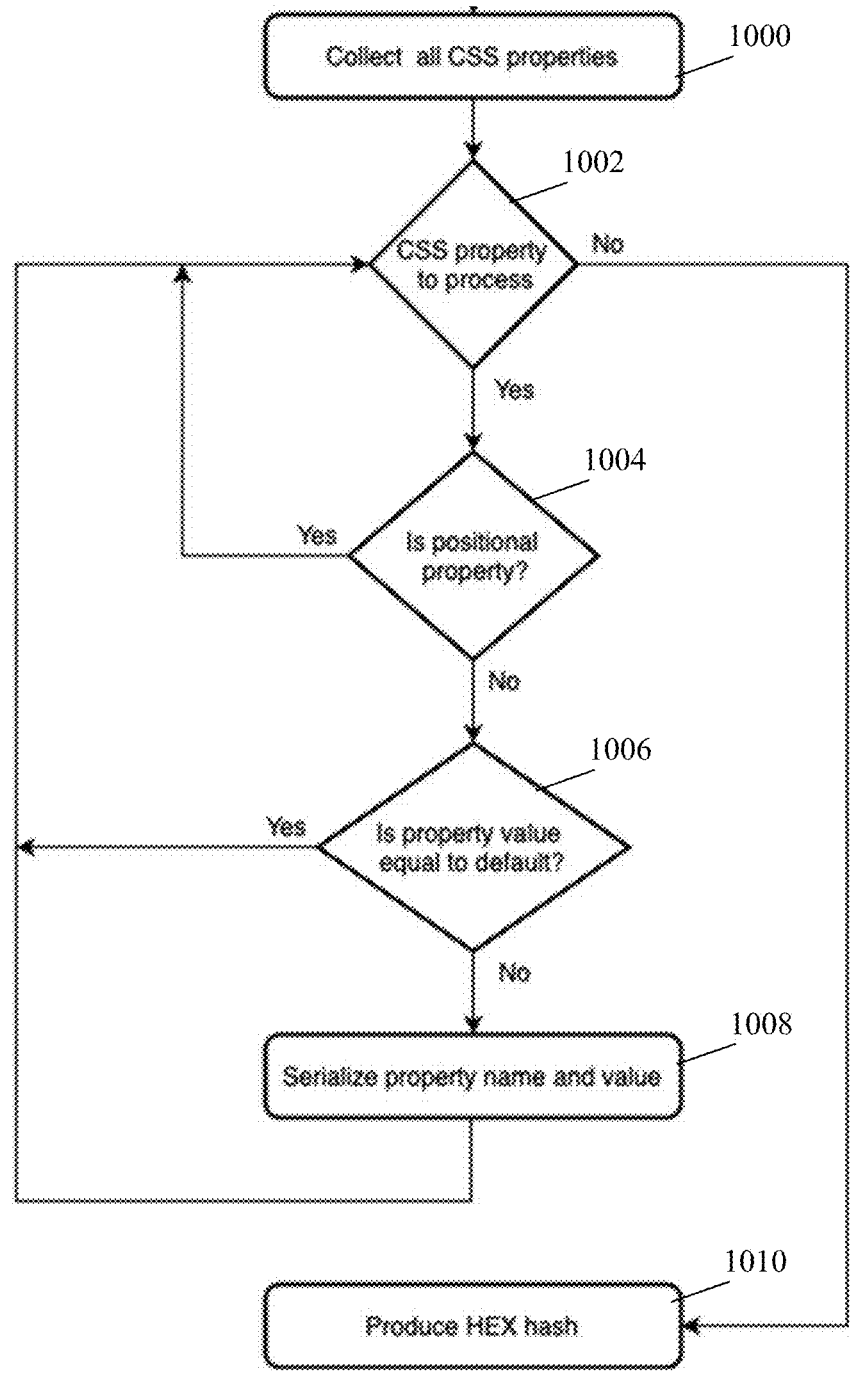
FIG. 10 is a flowchart of an exemplary method for generating an element hash value that can be used in the generation of a semantic layer hash value.

Referring to FIG. 10, a flowchart of an exemplary method for generating an element hash value that can be used in the generation of a semantic layer hash value is illustrated. In this example, the element hash value is a CSS element hash value, which is referred to in step 912 of FIG. 9 as a CSS hash, and the semantic layer hash value is a CSS semantic layer hash value. In step 1000, the accessibility analysis device 402 collects all the CSS properties associated with the CSS element that comprises the HTML element of the context box for which a semantic layer hash value is being generated as described and illustrated with reference to FIG. 9.

In step 1002, the accessibility analysis device 402 determines whether there is at least one additional CSS property to process. In a first iteration, the accessibility analysis device 402 will always determine that that is at least one CSS property remaining to be processed. Accordingly, in a first iteration, the Yes branch is taken from step 1002 to step 1004.

In step 1004, the accessibility analysis device 402 determines whether one of the CSS properties collected in step 1000 is a positional property (e.g., top, left, right and bottom properties). Since the position of particular web page elements is irrelevant to the CSS semantic layer for a context box, the CSS property is not considered in the CSS element hash value calculation nor, by extension, the CSS semantic layer hash value calculation. Accordingly, if the accessibility analysis device 402 determines in step 1004 that the CSS property is a positional property, then the Yes branch is taken back to step 1002 and the CSS property is effectively ignored. However, if the accessibility analysis device 402 determiners in step 1004 that the CSS property is not a positional property, then the No branch is taken to step 1006.

In step 1006, the accessibility analysis device 402 determines whether the CSS property value is equal to a default value (e.g., the value assigned by the web browser without author styles). Default values assigned by a web browser, as compared to values assigned by a developer of the web page, will not have accessibility issues and are not therefore considered in the CSS element hash value calculation. Accordingly, if the accessibility analysis device 402 determines in step 1006 that the CSS property value is equal to a default value, then the Yes branch is taken back to step 1002 and the CSS property is effectively ignored. However, if the accessibility analysis device 402 determiners in step 1006 that the CSS property value is not equal to a default value, then the No branch is taken to step 1008.

In step 1008, the accessibility analysis device 402 serializes the CSS property name and value. Accordingly, the accessibility analysis device 402 extracts and generates, or appends, a text string with the CSS property name and value. Subsequent to serializing the CSS property name and value, the accessibility analysis device proceeds back to step 1002 and processes any remaining ones of the CSS properties collected in step 1000 according to steps 1002-1008. Upon determining in a subsequent iteration of step 1002 that there are no remaining CSS properties to process, the No branch is taken to step 1010.

In step 1010, the accessibility analysis device 402 applies a hash function to the serialized property name(s) and value(s) to generates a CSS element hash value. As with the CSS semantic layer hash value, any hash function, including a SHA512 hash function, can be used to generate the CSS element hash value.

Referring back to FIG. 9, in step 914, the accessibility analysis device 402 serializes custom attributes (e.g., "href" for "a" elements and "src" for "img" elements). Accordingly, subsequent to step 914, the accessibility analysis device 402 will have generated a representation that includes a CSS element start tag, a CSS element accessibility data, CSS element hash values for all CSS properties associated with the CSS element, and custom attributes.

In step 916, the accessibility analysis device 402 serializes all of the child CSS elements of the CSS element by recursively performing steps 908-914 for each of the child CSS elements. In step 918, the accessibility analysis device 402 serializes the end tag for the CSS element by appending the end tag to the representation resulting from step 916. The accessibility analysis device 402 then applies a hash function to the representation resulting from step 918 to generate the CSS semantic layer hash value.

Referring to FIG. 11, source code 1100 for a web page fragment is illustrated. Referring to FIG. 12, text representation 1200 of a text semantic layer for the web page fragment 300 of FIG. 11 is illustrated. The text semantic layer representation 1200 could result from an exemplary execution by the accessibility analysis device of step 904 of FIG. 9, for example. A text semantic layer will not consider division and "b" elements, but will consider only their content. Attributes such as class, style, alt, title, and width also will not be considered. Additionally, all of the URL fragments (e.g., red_socks.jpg) are rewritten in canonical form and resolved as absolute URLs in this particular example.

The image element has a role (i.e., "img"), with an accessible name (i.e., "Red Socks"). Additionally, the H3 heading has a role (i.e., "heading"), with an accessible name (i.e., "Quality red socks"). The "a" element also has a role (i.e., "link"), with an accessible name (i.e., "Buy") and an accessible description (i.e., "free delivery"). Therefore, only issues regarding image, H3 and "a" elements can be associated to this text semantic layer. An exemplary application of a SHA512 hash function to the text semantic layer representation 1200, such as may be generated in step 906 of FIG. 9 is: "55f449fb7bcb600042159f6c98557908bc-8389912da02df221ec781fa2161f09a977750f1794e458b-99ee24dd727a7309bd02714f712945ba1c5e9ee79ba3d0b"

Referring to FIG. 13, a text representation 1300 of a CSS semantic layer for the web page fragment 300 of FIG. 11 is illustrated. In this example the division CSS element with class attribute equal to "product" has the following properties different from default values, which may be generated by the accessibility analysis device 402 in steps 1000-1008 of FIG. 10: "background-color:rgb(238, 238, 238);color:rgb(51, 51, 51);padding-bottom:10px;padding-left:10px;padding-right:10px;padding-top:10px;" The accessibility analysis device 402 in this particular example could apply a SHA512 hash function to this serialized representation of the CSS element to generate the following CSS element hash value: "606cdb188fa2701ab46288aafd9bd860ce5662-c2 957afe475ecad5d6c41cc1cc7ee69cc 15d4ecd4d0a95b-131961460cc0d7ad3b06288e82a279e66ecba8fba3f"

The division CSS element with class attribute equal to "product image" inherits background and color properties and has the following properties different from default values, which may be generated by the accessibility analysis device 402 in steps 1000-1008 of FIG. 10: background-color:rgb(238, 238, 238);color:rgb(51, 51, 51);margin-bottom:5px;margin-left:5px;margin-right:5px;margin-top:5px;" The accessibility analysis device 402 could apply a SHA512 hash function to this serialized representation of the CSS element to generate the following CSS element hash value: "8e6f7ae36e10578c7819bc63f18379605d8bf-150995ca85014da182f07d45a79f203990ca93261d528a-0cb3fc2efac6c92151a88b6b2a2f92b62f8924806f8f1"

All the remaining CSS elements inherit the following background and color properties from the first division element with class attribute equal to "product": "background-color:rgb(238, 238, 238);color:rgb(51, 51, 51);" The accessibility analysis device 402 could apply a SHA512 hash function to this serialized representation to generate the following CSS element hash value: "c085ef9c0c2adba-04fadfb1747002731f5bde81ba82e295c8d7b6e52d54d029-a89949ea75722ea009620ffe0e145b77d285ea1dcf24f504-212bcc4d7373cc52f"

An exemplary application of a SHA512 hash function to the CSS semantic layer representation 1300, such as may be generated in step 906 of FIG. 9 is: "567b8e79689b46-cca2899a1dde3a26b6c492b4cfb3361f1b7b4d73a717e5c8-8974d133225296775f6838d0ca806707bcc328078692-74ae0a86cd17136c691509" Accordingly, the CSS semantic layer hash value considers all elements, absent attributes not considered interesting or meaningful. Therefore, all accessibility issues regarding any element of the CSS semantic layer can be associated to that layer as described and illustrated in detail below.

Referring back to FIG. 6, in step 608, the accessibility analysis device 402 compares the semantic layer hash values generated in step 606 to stored semantic layer hash values. The semantic layer hash values could have been stored in the issue database 512 as described and illustrated in detail below with reference to step 620 and FIG. 14, for example.

An accessibility issue is uniquely identified by the context box semantic layer hash value (e.g., as generated in step 606 and/or stored in step 620) and the position of the element (e.g., the nth element descendant of a context box element with the same element name) associated with the accessibility issue within the context box. As explained below, the position is stored to distinguish multiple accessibility issues with multiple elements of a same context box. Thus, a first accessibility issue associated with an element of a context box at a stored position can be considered equivalent to a second accessibility issue for another element of another context box having a same semantic layer hash value in a different web page (e.g., of a same web site), and the review performed on the first accessibility issue will be valid for the second accessibility issue.

In step 610, the accessibility analysis device 402 determines whether there is at least one semantic layer hash value match based on the comparison in step 608. If the accessibility analysis device 402 determines that there is at least one semantic layer hash values match, then the Yes branch is taken to step 612.

In step 612, the accessibility analysis device 402 populates an issue report based on stored issues and associated reviews corresponding to the matching semantic layer hash values and element positions. Accordingly, the issue report can include indications of elements, their associated accessibility issues, and any prior review of those issues. Optionally, in examples in which a review is not yet stored for an issue, the issue report can be populated with an indication that the accessibility issue is without review and/or a recommended fix for the accessibility issue retrieved from a database and correlated with characteristic(s) of the accessibility issue. Subsequent to populated the issue report in 612, or if the accessibility analysis device 402 determines in step 610 that there are not semantic layer hash value matches and the No branch is taken, then the accessibility analysis device 402 proceeds to step 614.

In step 614, the accessibility analysis device 402 outputs the issue report to a GUI provided to the one of the user devices 406(1)-406(n) from which the request received in step 600 was received, for example, and obtains reviews correlated with elements of the web page for which new accessibility issues were identified, if any. The issue report can include the issues and associated reviews incorporated into the issue report in step 612 as well as new accessibility issues unique to the web page and identified based on the application of stored rule set(s) to aspects of the web page. The issue report allows a user of the one of the user devices 406(1)-406(n) to visualize the accessibility issues with the web page, obtain recommended fixes, determine how corresponding accessibility issues were previously addressed based on reviews populated in step 612, and/or view generated statistics regarding the accessibility of the web page, for example.

An obtained review can be an indication that the associated accessibility issue was ignored, an indication or description of a fix that was implemented to address the accessibility issue, or any other data or narrative regarding the accessibility issue received via the issue report GUI provided to the one of the user devices 406(1)-406(n), for example. By accurately identifying equivalent context boxes for particular semantic layers, and duplicative accessibility issues, manual review of the issue report can be reduced and the duplicative accessibility issues can be efficiently addressed based on prior reviews of those issues.

In step 616, the accessibility analysis device 402 determines whether there are any new accessibility issues identified for the web page. If the accessibility analysis device 402 did not populate the issue report based on any issues for which an associated review was not previously stored, or otherwise based on any accessibility issue not identified based on a prior review, (i.e., the web page is identical to a previously-evaluated web page), then the No branch is taken back to step 600 in this example. However, if the accessibility analysis device 402 determines that at least one new accessibility issue identified for the web page, then the Yes branch is taken from step 616 to step 618.

In step 618, the accessibility analysis device 402 assigns each new accessibility issue and associated review to a semantic layer of one of the context boxes containing the element associated with the new accessibility issue. The assignment in step 618, and subsequent storage in step 620, which will not be described, facilitate the match determination in a subsequent iteration of step 610 for another web page with duplicative accessibility issues.

Figure 14:
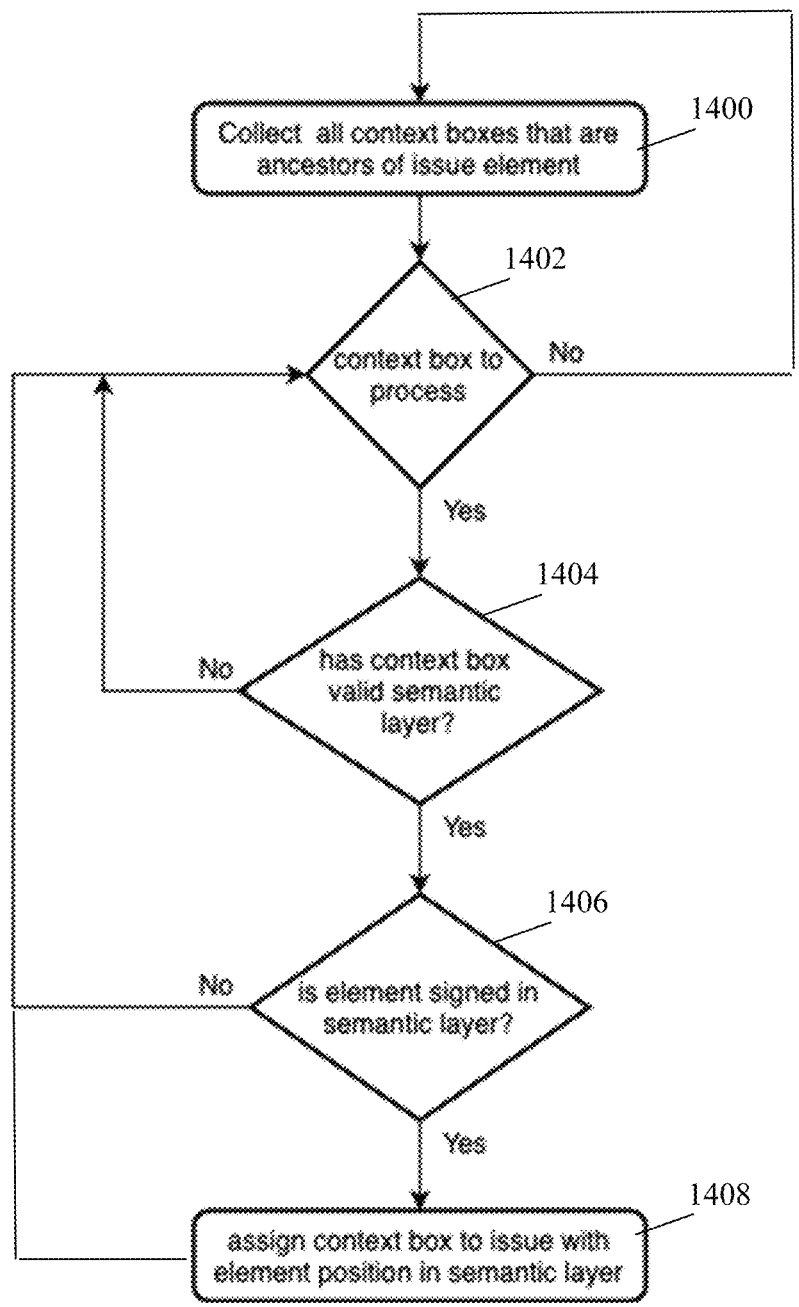
FIG. 14 is a flowchart of an exemplary method for associating an accessibility issue with a context box for a web page.

Referring to FIG. 14, a flowchart of an exemplary method for associating an accessibility issue with a context box for a web page is illustrated. In step 1400, the accessibility analysis device 402 collects all of the context boxes that are ancestors of an element associated with one of the new accessibility issues identified in step 616. The context boxes for the web page could have been identified as described and illustrated in detail above with reference to step 604 of FIG. 6, for example.

In step 1402, the accessibility analysis device 402 determines whether there is at least one context box to process. In this example, the collected context boxes are examined beginning with the innermost context box. In subsequent iterations, the accessibility analysis device 402 may determine that there are no more context boxes to process, in which case the No branch is taken from step 1402 back to step 1400. In a first iteration, the accessibility analysis device 402 will determine that there is at least one context box to process. Accordingly, in a first iteration, the Yes branch is taken to step 1404.

In step 1404, the accessibility analysis device 402 determines whether the innermost context box not yet processed has a semantic layer that is valid for the one of the new accessibility issues. To be a valid context box for the one of the new accessibility issues, the context box must support the semantic layer type associated to the accessibility issue. For example, not all context boxes can support the media or table layer types, and those context boxes unable to support the medial or table layer types would not be candidates for assignment to an accessibility issue of a media or table type.

Accordingly, each accessibility issue in this example can be correlated with a particular semantic layer in a table stored in the memory 502, for example. In one particular example, WCAG 2.0 1.4.3 "Contrast (Minimum)" can be violated based on the application of a rule set or evaluation algorithm because of the following accessibility issues: (1) insufficient contrast between text and its background; (2) insufficient contrast between text and its background image or gradient; or (3) element(s) without foreground specified. The CSS semantic layer described above has enough information to represent the first and third accessibility issues because it is contains or encapsulates information about foreground and background colors, font size, and text within the context box being analyzed. Thus, the first and second accessibility issues can be assigned to the CSS semantic layer.

However, the second accessibility issue requires more information than may be obtained from the CSS semantic layer because, by way of example, text can be over a part of the background image with different color based on the sizes of the context box and background image. Therefore, the second accessibility issue must be assigned to another semantic layer (e.g., a "layout semantic layer"). While examples of semantic layers, accessibility issues, and their correlations have been provided herein, other types of semantic layers can be associated to other types of accessibility issues in other examples based on the definition of those semantic layers and the information needed to understand whether an accessibility issue is present within a semantic layer for a particular context box.

If the accessibility analysis device 402 determines in step 1404 that the context box does not have an associated semantic layer that is valid for the accessibility issues associated with the element, then the No branch is taken back to step 1402. However, if the accessibility analysis device 402 determines that the context box has a semantic layer that is valid for the accessibility issues associated with the element, then the Yes branch is taken to step 1406.

In step 1406, the accessibility analysis device 402 determines whether the element is signed in the semantic layer for the context box. In this example, in step 1406, the accessibility analysis device 402 performs an additional validation to confirm that the element can be represented in the semantic layer hash value. In other words, the element must contribute with its attributes and/or content to the semantic layer hash value generation. If the accessibility analysis device 402 determines that the element is not signed in the semantic layer for the context box, then the No branch is taken back to step 1402. However, if the accessibility analysis device 402 determines that the element is signed in the semantic layer for the context box, then the Yes branch is taken to step 1408.

In step 1408, the accessibility analysis device 402 assigns the context box to the accessibility issue along with the position of the element in the context box or the semantic layer of the context box. The assignment can be carried out based on storing various information in the issue database 512, for example, as described and illustrated below with reference to step 620 of FIG. 6. Subsequent to assigning the context box to the accessibility issue, the accessibility analysis device 402 proceeds back to step 1400. Accordingly, in this example, steps 1400-1408 are repeated for each new accessibility issue identified in step 616 of FIG. 6 that is assignable to a context box.

Referring back to FIG. 6, in step 620, the accessibility analysis device 402 stores, in the issue database 512 and for each of the new accessibility issues identified in step 616, an indication of the accessibility issue, the associated review obtained in step 614, the semantic layer hash value generated in step 606 for the semantic layer associated with the accessibility issue and context box assigned to the accessibility issue in step 618, and the position within the context box of the element associated with the accessibility issue.

Multiple accessibility issues associated with a same semantic layer could be assigned to multiple elements within a same context box, with the only distinguishing characteristic maintained in the issue database 512 being the position of those elements. Accordingly, storage of the element position is required to recognize equivalent accessibility issues when reapplying stored accessibility issue reviews to new evaluation or different web pages in a same web site. Storage of the indication of the accessibility issue, review, semantic layer hash value, and element position facilitate the automatic population of the issue report explained in detail above with reference to steps 608-612 of FIG. 6. Subsequent to step 620, the accessibility analysis device 402 proceeds back to step 600 in this example. In other examples, one or more of steps 600-620 can be performed in parallel and/or in a different order.

As described and illustrated by way of the examples herein, this technology more accurately and efficiently analyzes web page accessibility issues across a web site by reducing or eliminating duplicative accessibility evaluations of web page fragments (e.g., context boxes) that are equivalent across semantic layer(s) associated with particular accessibility issues. With this technology, prior reviews of accessibility issues can advantageously be used to populate an issue report, without requiring manual review of the accessibility issues, for equivalent web pages portions (e.g., portions of semantic layers for context boxes) that are not identical. Accordingly, this technology advantageously identifies and outputs prior reviews (instead of default recommendations, for example) for accessibility issues present in elements of context boxes that are not identical, but are equivalent across semantic layer(s), thereby reducing the computing resources required to conduct web site accessibility evaluations while improving the result of such evaluations.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for evaluating web site accessibility, the method implemented by one or more accessibility analysis devices and comprising:
identifying a first context box of a first web page based on disposition, geometry, or role of one or more elements within the first context box in response to a received request to evaluate accessibility of the first web page;
applying a hash function to one or more properties of one or more of the elements to generate a first semantic layer hash value for a first semantic layer for the first context box, wherein the properties or the one or more of the elements are identified based on a type of the first semantic layer;
determining that the first context box is equivalent to a second context box of a second web page with respect to the first semantic layer based on a match of the first semantic layer hash value to a stored second semantic layer hash value generated during a prior accessibility evaluation of the second web page;
retrieving from an issue database a review of an accessibility issue associated with one of the one or more of the elements based on the second semantic layer hash value; and
generating an issue report comprising the accessibility issue, the review, and the one of the one or more of the elements and outputting the issue report in response to the received request.

2. The method of claim 1, further comprising removing one or more parameters from a generated document object model (DOM) of the first web page to normalize the DOM prior to identifying the first context box, wherein the parameters comprise session parameters or tracking or third party script, inline frame, or image uniform resource locators (URLs) parameters.

3. The method of claim 1, wherein the properties comprise an element name, an element value, a start tag, an end tag, accessibility data, a custom attribute, or a child element, and the method further comprises:
serializing the properties to generate a text string; and
applying the hash function to the serialized text string to generate the semantic layer hash value.

4. The method of claim 1, wherein the first semantic layer comprises a cascading stylesheet (CSS) semantic layer, at least one of the properties comprises a CSS element hash value, and the method further comprises:
determining that a CSS element within the first context box is not a positional element and that a value of the CSS element is not a default value; and
applying another hash function to a name and the value of the CSS property to generate the CSS element hash value.

5. The method of claim 1, further comprising:
determining that the second context box has a second semantic layer of the type of the first semantic layer and that the one of the one or more of the elements is signed in the second semantic layer; and
assigning the accessibility issue to the second context box, wherein the accessibility issue is associated with the type of the first semantic layer.

6. The method of claim 1, further comprising:
applying one or more rule sets generated based on accessibility guidelines to the second web page to identify the accessibility issue with the second web page;

obtaining the review of the accessibility issue, wherein the review comprises an indication of a fix for the accessibility issue; and storing in the issue database an entry comprising the second semantic layer hash value, the accessibility issue, the review of the accessibility issue, and a position of the one of the one or more of the elements within the second context box.

7. An accessibility analysis device, comprising memory comprising programmed instructions stored thereon and one or more processors configured to execute the stored programmed instructions to:

identify a first context box of a first web page based on disposition, geometry, or role of one or more elements within the first context box in response to a received request to evaluate accessibility of the first web page;

apply a hash function to one or more properties of one or more of the elements to generate a first semantic layer hash value for a first semantic layer for the first context box, wherein the properties or the one or more of the elements are identified based on a type of the first semantic layer;

determine that the first context box is equivalent to a second context box of a second web page with respect to the first semantic layer based on a match of the first semantic layer hash value to a stored second semantic layer hash value generated during a prior accessibility evaluation of the second web page;

retrieve from an issue database a review of an accessibility issue associated with one of the one or more of the elements based on the second semantic layer hash value; and generate an issue report comprising the accessibility issue, the review, and the one of the one or more of the elements and output the issue report in response to the received request.

8. The accessibility analysis device of claim 7, wherein the processors are further configured to execute the stored programmed instructions to remove one or more parameters from a generated document object model (DOM) of the first web page to normalize the DOM prior to identifying the first context box, wherein the parameters comprise session parameters or tracking or third party script, inline frame, or image uniform resource locators (URLs) parameters.

9. The accessibility analysis device of claim 7, wherein the properties comprise an element name, an element value, a start tag, an end tag, accessibility data, a custom attribute, or a child element, and the processors are further configured to execute the stored programmed instructions to:

serialize the properties to generate a text string; and
apply the hash function to the serialized text string to generate the semantic layer hash value.

10. The accessibility analysis device of claim 7, wherein the first semantic layer comprises a cascading stylesheet (CSS) semantic layer, at least one of the properties comprises a CSS element hash value, and the processors are further configured to execute the stored programmed instructions to:

determine that a CSS element within the first context box is not a positional element and that a value of the CSS element is not a default value; and apply another hash function to a name and the value of the CSS property to generate the CSS element hash value.

11. The accessibility analysis device of claim 7, wherein the processors are further configured to execute the stored programmed instructions to:

determine that the second context box has a second semantic layer of the type of the first semantic layer and that the one of the one or more of the elements is signed in the second semantic layer; and assign the accessibility issue to the second context box, wherein the accessibility issue is associated with the type of the first semantic layer.

12. The accessibility analysis device of claim 7, wherein the processors are further configured to execute the stored programmed instructions to:

apply one or more rule sets generated based on accessibility guidelines to the second web page to identify the accessibility issue with the second web page;

obtain the review of the accessibility issue, wherein the review comprises an indication of a fix for the accessibility issue; and store in the issue database an entry comprising the second semantic layer hash value, the accessibility issue, the review of the accessibility issue, and a position of the one of the one or more of the elements within the second context box.

13. The accessibility analysis device of claim 7, wherein the first context box comprises a first fragment of source code of the first web page and the first source code fragment is different than a second source code fragment of the second context box with respect to one or more other semantic layers.

14. A non-transitory computer readable medium having stored thereon instructions for evaluating web site accessibility comprising executable code which when executed by one or more processors, causes the processors to:

identify a first context box of a first web page based on disposition, geometry, or role of one or more elements within the first context box in response to a received request to evaluate accessibility of the first web page;

apply a hash function to one or more properties of one or more of the elements to generate a first semantic layer hash value for a first semantic layer for the first context box, wherein the properties or the one or more of the elements are identified based on a type of the first semantic layer;

determine that the first context box is equivalent to a second context box of a second web page with respect to the first semantic layer based on a match of the first semantic layer hash value to a stored second semantic layer hash value generated during a prior accessibility evaluation of the second web page;

retrieve from an issue database a review of an accessibility issue associated with one of the one or more of the elements based on the second semantic layer hash value; and generate an issue report comprising the accessibility issue, the review, and the one of the one or more of the elements and output the issue report in response to the received request.

15. The non-transitory computer readable medium of claim 14, wherein the executable code when executed by the processors further causes the processors to remove one or more parameters from a generated document object model (DOM) of the first web page to normalize the DOM prior to identifying the first context box, wherein the parameters comprise session parameters or tracking or third party script, inline frame, or image uniform resource locators (URLs) parameters.

16. The non-transitory computer readable medium of claim 14, wherein the properties comprise an element name, an element value, a start tag, an end tag, accessibility data, a custom attribute, or a child element, and the executable code when executed by the processors further causes the processors to:

serialize the properties to generate a text string; and apply the hash function to the serialized text string to generate the semantic layer hash value.

17. The non-transitory computer readable medium of claim 14, wherein the first semantic layer comprises a cascading stylesheet (CSS) semantic layer, at least one of the properties comprises a CSS element hash value, and the executable code when executed by the processors further causes the processors to:

determine that a CSS element within the first context box is not a positional element and that a value of the CSS element is not a default value; and apply another hash function to a name and the value of the CSS property to generate the CSS element hash value.

18. The non-transitory computer readable medium of claim 14, wherein the executable code when executed by the processors further causes the processors to:

determine that the second context box has a second semantic layer of the type of the first semantic layer and that the one of the one or more of the elements is signed in the second semantic layer; and assign the accessibility issue to the second context box, wherein the accessibility issue is associated with the type of the first semantic layer.

19. The non-transitory computer readable medium of claim 14, wherein the executable code when executed by the processors further causes the processors to:

apply one or more rule sets generated based on accessibility guidelines to the second web page to identify the accessibility issue with the second web page;

obtain the review of the accessibility issue, wherein the review comprises an indication of a fix for the accessibility issue; and store in the issue database an entry comprising the second semantic layer hash value, the accessibility issue, the review of the accessibility issue, and a position of the one of the one or more of the elements within the second context box.

20. The non-transitory computer readable medium of claim 14, wherein the first context box corresponds to a non-empty table or form, a hypertext markup language (HTML) semantic element, a multimedia element, a title and associated content, a non-empty horizontal bar, a colored section, or a combination of a class attribute and a defined geometry.

\* \* \* \* \*